Patented Oct. 23, 1934

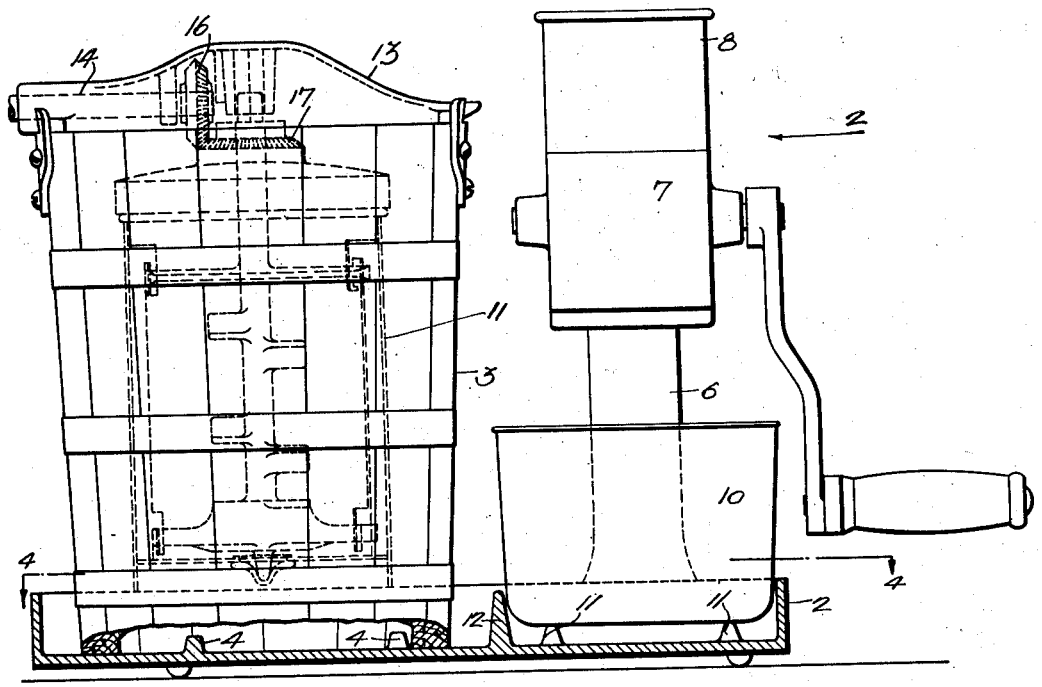
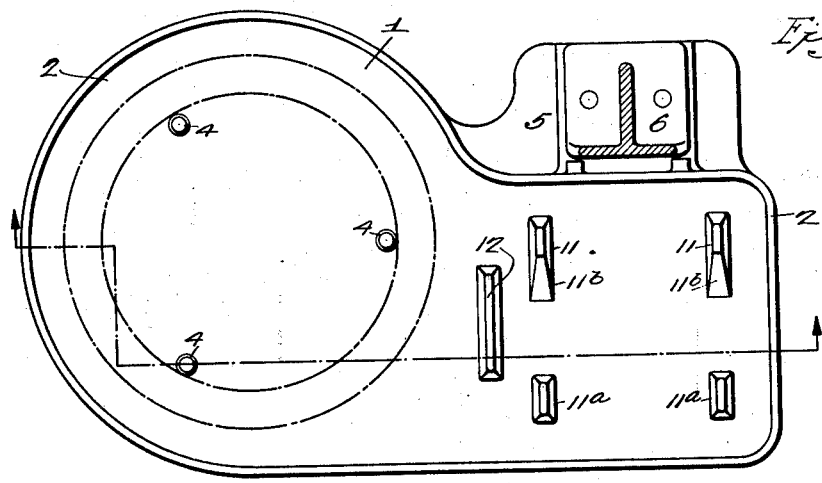
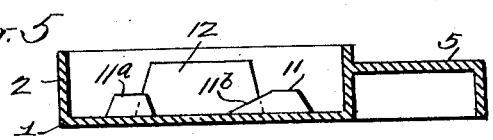

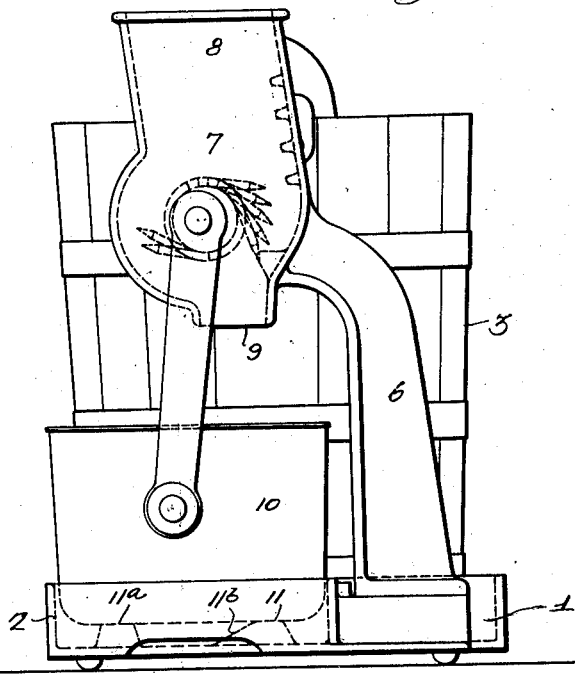
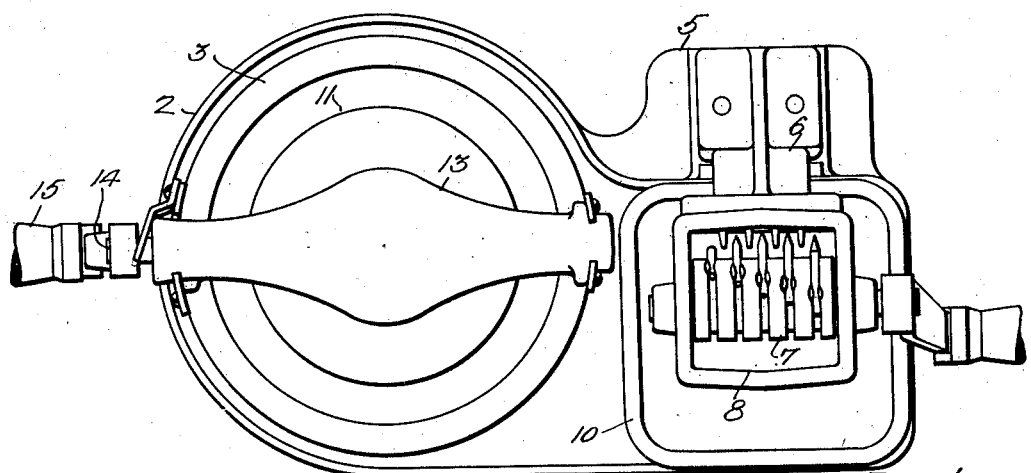

1,978,299

UNITED STATES PATENT OFFICE 1,978,299

TRAY FOR SUPPORTING AN ICE CUBE BREAKER AND AN ICE CREAM FREEZER

Thomas J. Fegley, Jenkintown, and George O. Leopold, Philadelphia, Pa., assignors to North Bro's M'f'g Co., Philadelphia, Pa., a corporation of Pennsylvania Application October 7, 1932, Serial No. 636,766

2 Claims. (Cl. 248—14)

Our invention relates to certain improvements in means for making ice cream on a small scale, in which the ice cubes from a mechanical refrigerator are used.

One object of our invention is to provide a tray for supporting an ice cube breaker and ice cream freezer so that they will be in close proximity, the ice cream freezer being so proportioned that it will accommodate the particles of ice broken from ice cubes.

A further object of the invention is to so design the tray that the ice cube breaker can be permanently fastened thereto while the tub of the freezer is made detachable and the tray is provided with a flange which prevents any splashing of the brine during the process of making the ice cream. The invention also relates to means for supporting the receptacle of the ice breaker so that it can be readily placed in position or removed from the tray.

In the accompanying drawings:

Fig. 1 is a side view, partly in section, of our improved tray showing an ice cube breaker and ice cream freezer mounted on a tray;

Fig. 2 is an end view looking in the direction of the arrow 2, Fig. 1;

Fig. 3 is a plan view;

Fig. 4 is a sectional plan view on the line 4—4, Fig. 1 of the tray, the tub of the ice cream freezer and the receptacle for the ice cube breaker being removed; and Fig. 5 is a transverse sectional view of the tray on the line 5—5, Fig. 4.

1 is a tray shaped as shown in Fig. 4 and having a deep flange 2 which extends entirely around the tray. The tray is enlarged at one end to receive the tub 3 of an ice cream freezer and pins 4 made integral with the tray project a sufficient distance to center the tub on the tray so that there is a clear space between the tub and the flange 2 for the escape of brine during the process of making ice cream.

The tray 1 has a lateral integral extension 5, to which a standard 6 is secured. At the upper end of the standard is an ice cube breaker 7 which has a hopper 8 into which the cubes are placed and has a discharge opening 9 at the bottom which is directly above a receptacle 10 mounted on the tray, so that as the ice cubes are broken into small pieces these pieces drop into the receptacle and the receptacle is detachable so that its contents can be placed within the tub of the ice cream freezer. The space between the tub and the can of the freezer is such that all the particles of ice which are broken by the ice cube breaker can be placed within the space so that there is no loss of ice. The particular form of breaker shown forms the subject of a separate application for a patent, filed by us on July 29, 1931, under Serial No. 553,858, and we lay no claim to the particular mechanism.

The receptacle 10 rests upon projections 11—11a on the tray so as to allow sufficient space for excess of brine, and these projections are so shaped that the receptacle can be readily removed when desired. 12 is a partition which is of such a height as to hold the receptacle against longitudinal movement on the tray, the receptacle being held between this partition 12 and the flange 2. It will be noted that the projections 11 which support the receptacle 10 are beveled at 11b. This allows the receptacle to be raised at one side and removed from the tray, and when the receptacle is placed in the base it will slide upon the inclined surface until it assumes a position of rest on all the projections.

The ice cream freezer consists of the tub 3, the can 11, and the cross-bar 13, which is detachably secured to the tub and has bearings for the driving shaft 14, which has a handle 15. The shaft in this instance has a beveled pinion 16 which meshes with a circular rack 17 on the cap of the can. We lay no claim to the particular mechanism of this ice cream freezer as any suitable mechanism may be used to rotate the can in the tub.

It has been found by experience that to make a quart of ice cream in the freezer it will take two fillings of the receptacles with broken ice cubes to pack the space between the can and the tub and then it will take another full receptacle of broken ice to pack the ice cream after it has been churned. Ice cubes from one freezing of a small refrigerator will be sufficient. If it is desired, the can may be removed from the tub and placed bodily in the refrigerator after the ice cream has been made, and can be retained in the refrigerator for a long period before it need be used and yet it will remain in good condition.

This equipment is especially designed for small apartments or houses using small refrigerators, where one freezing of ice cubes will freeze one quart of ice cream.

We claim:

1. A tray for supporting an ice cube breaker and an ice cream freezer, having adjoining areas shaped respectively for the reception of an ice cream freezer and a cracked ice receptacle, the tray having a deep flange embracing said areas, and having a lateral extension to which an ice cube breaker may be secured, the tray having projecting means for centering the said freezer in its area in spaced relation to the flange; the tray having projections for elevating the ice receptacle of the breaker above the bottom of the tray and a partition for maintaining said receptacle within its tray area.

2. A tray for supporting an ice cube breaker having a detachable ice receptacle, said tray having a deep flange embracing the area in which the receptacle is located, and having a lateral extension to which the ice cube breaker may be secured, a plurality of lugs projecting upwards from the bottom of the tray for supporting the ice receptacle at least one of said lugs having an inclined side surface constituting a guide for the receptacle facilitating insertion of the receptacle under the ice cube breaker and onto the lugs.

THOMAS J. FEGLEY.
GEORGE O. LEOPOLD